United States Patent Office 3,525,803
Patented Aug. 25, 1970

3,525,803
MEANS FOR DETECTING MALIGNANT CELLS
IN HUMAN AND ANIMAL TISSUE
Desmond Smart, Newcastle-upon-Tyne, England, assignor to International Research & Development Company Limited, Fossway, Newcastle-upon-Tyne, England
Filed July 28, 1967, Ser. No. 656,751
Claims priority, application Great Britain, Aug. 1, 1966, 34,474/66
Int. Cl. A61b 5/00; H04n 7/00; G01n 21/40
U.S. Cl. 178—6
8 Claims

ABSTRACT OF THE DISCLOSURE

A method of detecting malignant cells in which a tissue or cervical smear is illuminated with plane polarized light emitted by a laser and changes in polarization of the light transmitted are detected with the aid of a polarizing analyzer. Two microscopes respectively receive light transmitted through a specimen alone and light transmitted both through the specimen and the analyzer, and two television cameras, synchronously scanned, record the images formed in the two microscopes, there being a single display screen connected to the cameras to produce a composite image on the screen, normal cells producing a bright image and malignant cells a dark image.

This invention relates to means for detecting malignant cells in human and animal tissues.

It is generally accepted that there are biochemical differences between malignant cells and normal cells. These differences occur in the nucleus and the cytoplasm of the malignant cell since the rate of division and the cell chemistry in such cells are different from normal cells.

According to the present invention a method of detecting malignant cells in human or animal tissue comprises the steps of illuminating the tissue to be examined by light polarised in one plane, and detecting charges in the polarisation of the light transmitted by different areas of the tissue.

The light used to illuminate the tissue can be normal white light or light from a gas laser. If white light is used, a polarising element is interposed between the light source and a plate on which the tissue is mounted. In the case of the laser light, the light is by its nature, plane polarised.

The method relies on the property of a malignant cell to rotate the plane of polarisation of light incident upon it by a different amount from the rotation produced by a normal cell. If therefore, the means for polarising the light transmitted by tissue under examination is adjusted so that it cuts off light transmitted through the tissue when normal tissue is examined, the presence of a malignant cell in suspect tissue, would produce a rotation of the plane of polarisation and some light would be transmitted.

In a preferred form the optical means for examining the tissue comprise a microscope incorporating a polarising element.

For rapid examination of a series of specimens a second microscope is used to examine the specimen by transmitted light without the interposition of a polariser. The malignant cells cause greater scattering of the light than the normal cells and hence appear darker. The images produced by the two microscopes are scanned in synchronism by separate television cameras and are superimposed on a viewing screen so that whereas when normal cells are present they show up as bright rings on a dark ground seen by transmitted light and no picture is received through the polariser, on the other hand when malignant cells are present the rotation of the plane of polarisation causes a bright ring to appear through the polariser but this is cancelled out by the darkening of the corresponding area of the image seen without a polariser and the screen appears dark. The screen can be filmed and the developed film projected on to a photo-electric cell to discover the cases in which the presence of a malignant cell has caused darkening of the screen.

Figure 1:
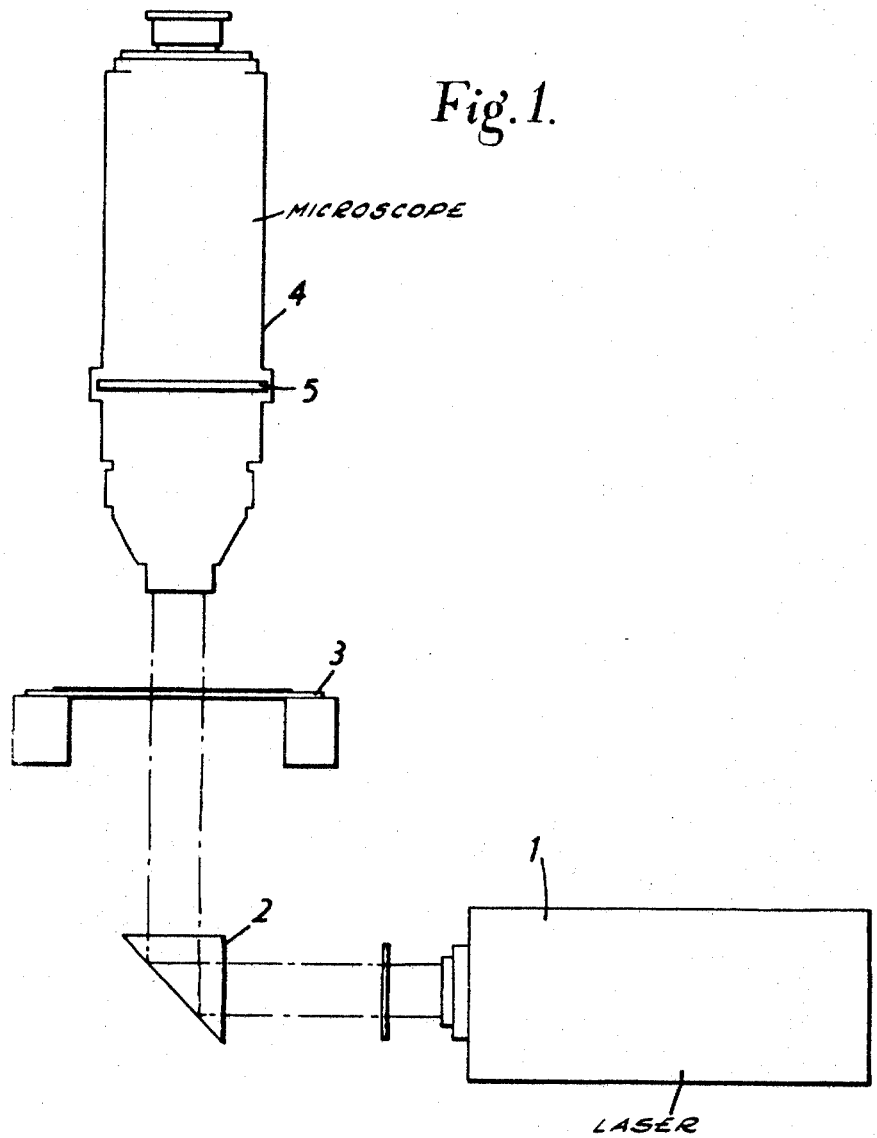
Figure 2:
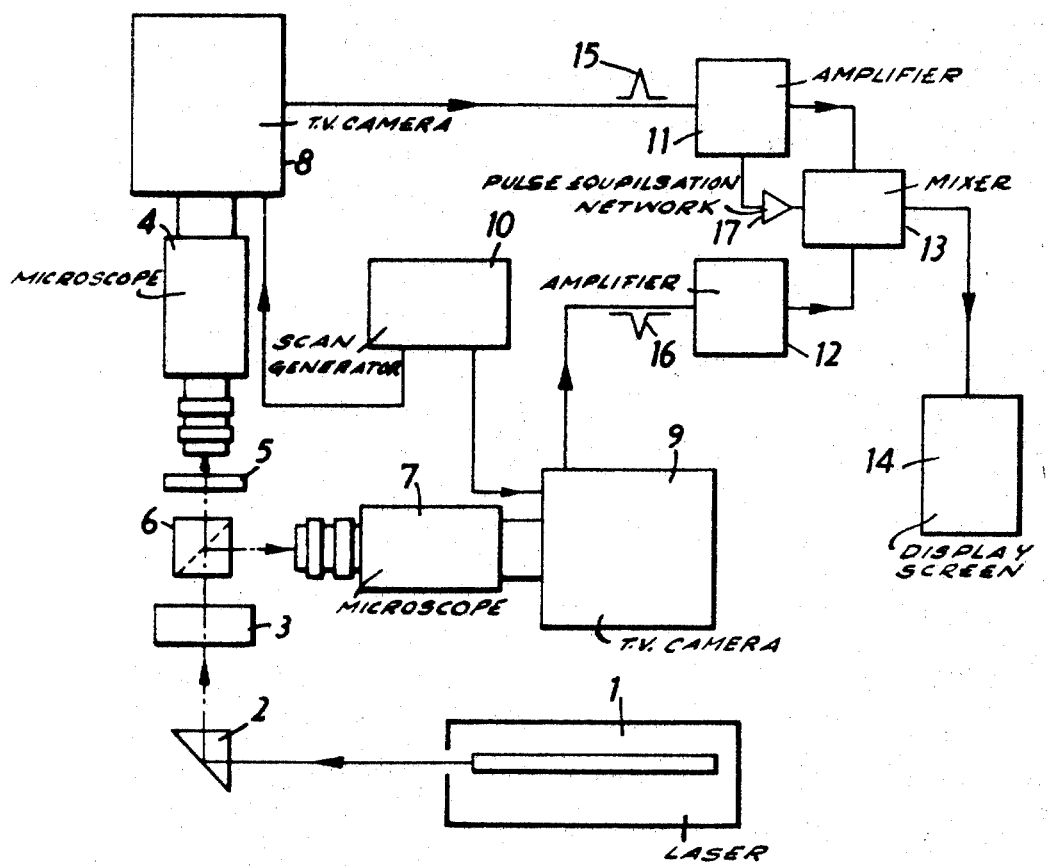

The invention will now be described in more detail with the aid of examples illustrated in the accompanying drawings, in which:

FIG. 1 shows diagrammatically one arrangement of apparatus for carrying out the examination of tissues in accordance with the invention, and FIG. 2 is a block diagram of a form of apparatus for rapid examination in accordance with the invention of a series of specimens.

Referring to FIG. 1, means for detecting malignant cells in human and animal tissue comprise a gas laser 1, such as a helium-neon gas laser producing plane-polarised light at 6328° A., a prism 2 for turning the light from the laser through a right angle onto a plate 3 on which tissue under examination is mounted, and a microscope 4 containing a polarising element 5.

The polarising element 5 is rotatable so as to be capable of polarising the light transmitted through the tissue in a plane at right angles to the plane of polarisation of the laser light. If, therefore, tissue containing normal cells is examined first and the polariser 5 rotated so that no light is transmitted to the eyepiece of the microscope, the subsequent examination of tissues containing malignant cells would produce rotation of the planes of polarisation of the light and some light would be transmitted.

If desired the polariser 5 may be rotated to a position such that some light is transmitted by normal tissue and the difference in intensity between the light transmitted by normal tissue and that transmitted by tissue having malignant cells, could then be compared.

In the arrangement shown, a gas laser 7 is used but a source of white light could be used instead. In such a case an additional polariser would be inserted between the source and the plate 3 so as to polarise the light in one plane.

The means described afford a simple and reliable means for detecting malignant cells in human adenocarcinomata and can be used to detect malignant cells in cervical smears.

In the embodiment of FIG. 2 light from a laser 1 is again directed by a prism 2 on to a specimen slide 3 and is examined by a microscope 4 through a polariser 5. A beam-splitter 6 is interposed between the specimen slide 3 and the polariser 5 and directs some of the transmitted light to a second microscope 7. The microscopes 4 and 7 see part of the area of the slide 3 and have television cameras 8 and 9, respectively, coupled to them to scan the microscope images under the control of a common line and frame scan generator 10 which maintains synchronism between the two scans. The signals from the cameras 8 and 9 are passed through respective amplifiers 11 and 12 to a mixer unit 13 and the combined signals applied to a display screen 14.

When only normal cells are present in the field of view of the microscopes the setting of the polariser 5 is such that minimum light is transmitted to the camera 8. The camera 9 transmits to the screen 14 a picture in which the edges of the normal cells show up as bright rings against a dark background. This corresponds to the picture seen by the microscope 7 by transmitted light and since the signals from the camera 8 are at a low level they do not affect this picture. When a malignant cell is present in the field of view it causes rotation of the plane of polarisation of the transmitted light and consequently the camera 8 transmits a signal, corresponding to a bright ring, which is represented by a positive-going pulse 15. If this were to appear on the screen 14 it would produce an appearance similar to that of a normal cell but in addition to rotating the plane of polarisation the malignant cell causes increased scattering and thus a darkening of the image seen by the camera 9 relative to the surroundings. This darkening is represented by a negative-going pulse 16. The superimposition of the pulses 15 and 16 produces a dark region on the screen 14. To ensure full cancellation of the pulse 15 by the pulse 16 a pulse equalisation network 17 is connected between the mixer 13 and the amplifier 11 to compare the pulses and adjust the gain of amplifier 11 until they are equal in amplitude.

In general, the area covered by the field of view of the microscopes is such that if malignant cells are present they will fill this area and hence the screen 14 will show no picture. In any case it will only show normal cells and any substantial reduction in the total light appearing on the screen will indicate the probable presence of malignant cells. To overcome the difficulty caused by the presence of normal cells amongst malignant cells it is possible to use a pulse coincidence detector which would detect the simultaneous presence of the pulses 15 and 16 as an indication of the presence of a malignant cell.

Such apparatus and method can readily be applied to analysis of large numbers of samples of tissue particularly in the analysis of cervical smears. The analysis can be carried out by visual observation of the monitor screen 12 or by photographing the picture produced by each sample using say a ciné-camera synchronized with the television cameras. The number of the slide containing the sample can be superimposed on the monitor screen 6. If the monitor screen is filmed, the developed film can be passed before a photo-sensitive detector which allows the film to continue running as long as a picture is present on the monitor. When there is no picture on the monitor, corresponding to a positive smear, the detector produces a signal which is used to stop the film and the number of the smear is noted.

Such apparatus enables the examination of cervical smears to be automated and removes from the operator the need to identify positive smears. The superimposition of the images in the manner described also has the advantage that the presence of optically active foreign bodies on the smear does not affect the readings obtained on the monitor screen as both cameras receive light from the smear and any effects produced by such bodies cancel out.

I claim:
1. Apparatus for detecting malignant cells in human or animal tissue, comprising:
   a laser producing a beam of plane polarized light;
   means for directing the light from said laser onto a specimen stage on which specimen tissue is to be mounted for examination;
   a polarizing element located to receive a beam of light transmitted by a specimen tissue when mounted on the stage; and
   means for detecting changes in polarization of the light received through said polarizing element from different areas of said specimen tissue.

2. Apparatus according to claim 1, wherein said means for detecting changes in polarization of the light received from said polarizing element comprise a microscope.

3. Apparatus according to claim 2, including a television camera associated with said microscope to scan the image produced thereby, a second microscope for examining light transmitted by said specimen tissue, before the transmitted light passes through said polarizing element, a second television camera associated with said second microscope to scan the image produced thereby and means for displaying the outputs of the said two cameras.

4. Apparatus according to claim 3, wherein said means for displaying the outputs of the said two cameras comprise a monitor screen on which the images produced by the cameras are superimposed.

5. Apparatus according to claim 4, having a common line and frame scan generator coupled to the said two cameras whereby their associated microscope images are scanned in synchronism.

6. Apparatus according to claim 3 wherein separate amplifiers are connected to receive the outputs of the said two cameras and wherein a mixer is interposed between sai dtwo amplifiers and said display means whereby the outputs of the said two amplifiers are combined to produce a superimposed image on said display means.

7. Apparatus according to claim 6, wherein a pulse equalization network is connected between said mixer and that amplifier, which amplifies the output of said television camera coupled to said microscope which receives light through said polarizing element, to adjust the gain of that said amplifier whereby the two outputs from said two amplifiers cancel, the display means thereby producing a dark image when a malignant cell is present.

8. Apparatus according to claim 1, further including photographic apparatus to record the display means being provided to synchronize the operation of the photographic apparatus with the television cameras.

References Cited

UNITED STATES PATENTS
3,335,716    8/1967    Alt et al. _____ 128—2

ROBERT L. GRIFFIN, Primary Examiner

H. W. BRITTON, Assistant Examiner

U.S. Cl. X.R.

73—432; 188—2; 356—116